United States Patent
Chang et al.

(10) Patent No.: US 8,830,600 B2
(45) Date of Patent: Sep. 9, 2014

(54) LENS MODULE

(71) Applicant: Glory Science Co., Ltd., Changhua Hsien (TW)

(72) Inventors: Liang Yu Chang, Changhua Hsien (TW); Shih Ying Ke, Changhua Hsien (TW); Chih Kang Huang, Changhua Hsien (TW); Cheng Feng Yen, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 24 days.

(21) Appl. No.: 13/744,570

(22) Filed: Jan. 18, 2013

(65) Prior Publication Data

US 2014/0204481 A1  Jul. 24, 2014

(51) Int. Cl.
*G02B 7/02* (2006.01)

(52) U.S. Cl.
CPC ..................... *G02B 7/021* (2013.01)
USPC ........................................... 359/811; 359/819

(58) Field of Classification Search
CPC ............................. G02B 7/022; G02B 7/021
USPC .................... 359/793, 796, 811, 819; 396/529
See application file for complete search history.

(56) References Cited

U.S. PATENT DOCUMENTS

| | | | |
|---|---|---|---|
| 7,724,452 B2 * | 5/2010 | Huang | 359/811 |
| 7,755,858 B2 * | 7/2010 | Chen | 359/819 |
| 7,773,319 B2 * | 8/2010 | Yu | 359/811 |
| 7,813,058 B2 * | 10/2010 | Huang | 359/793 |
| 7,830,623 B2 * | 11/2010 | Hara | 359/811 |
| 8,169,721 B2 * | 5/2012 | Lin et al. | 359/793 |
| 8,208,209 B2 * | 6/2012 | Lee et al. | 359/819 |
| 8,493,673 B2 * | 7/2013 | Yen | 359/811 |
| 8,570,672 B2 * | 10/2013 | Lin | 359/811 |

* cited by examiner

*Primary Examiner* — David N Spector
(74) *Attorney, Agent, or Firm* — Lin & Associates IP, Inc.

(57) ABSTRACT

A lens module with an optical axis passing therethrough from an object side to an image side includes a lens housing and two lenses disposed in the lens housing. The first lens has a first refractive portion and a first positioning portion encircling the first refractive portion. A first mating structure is formed on the image side surface of the first positioning portion and molded with the first refractive portion as a single integral. The second lens has a second refractive portion and a second positioning portion encircling the second refractive portion. A second mating structure is formed on the object side surface of the second positioning portion and molded with the second refractive portion as a single integral. The mating structures are engaged to align the lenses along the optical axis, and the refractive portions are coaxial with each other and have the axis as the optical axis.

4 Claims, 4 Drawing Sheets

LENS MODULE

BACKGROUND OF THE INVENTION

1. Field of the Invention

This invention relates to a lens module, and more particularly to a lens module used in mobile electronic products.

2. The Related Art

With the popularity of camera phones, the quality of photography has become one of the main considerations for consumers to purchase a new mobile phone having a lens module therein. In order to make photographic quality of the lens module better and the size and the weight of the mobile phone slimmer, the allowable error value of assembling optical lens of the lens module is also getting strict. Take a general two-megapixel camera lens for an example, the eccentric error while assembling the optical lenses must be less than 3 μm.

Referring to FIG. 1, a conventional lens module includes a lens housing 90 and several optical lenses 91 mounted in the lens housing 90. Each of the optical lenses 91 includes a refractive portion 92 closed to the optical axis 94 and a positioning portion 93 away from the optical axis 94. The optical lens 91 is assembled and fixed in the lens housing 90 by means of the positioning portion 93. So the manufacturing error of the lens housing 90 will affect the assembling error of the optical lens 91. Therefore, in order to reduce the assembling error of the optical lens 91, the manufacturing error of the lens housing 90 must be controlled in a sufficiently small value. However, since the manufacture process and the mold precision of the optical lens 91 are different from that of the lens housing 90, the lens housing 90 often has a higher manufacturing tolerance than the optical lens 91. It causes a higher assembling error of the lens module and a lower production yield.

In view of these disadvantages above, the structure of the conventional lens module needs to be improved.

SUMMARY OF THE INVENTION

An objective of this invention is to provide a lens module with high assembling accuracy and high production yield. An optical axis passes through the lens module from an object side to an image side. The lens module includes a lens housing, a first lens and a second lens which are disposed in the lens housing from the object side to the image side in sequence.

The first lens has a first refractive portion through which the optical axis passes and a first positioning portion away from the optical axis and encircling the first refractive portion. A first mating structure is annularly formed on the image side surface of the first positioning portion and molded with the first refractive portion as a single integral. The second lens has a second refractive portion through which the optical axis passes and a second positioning portion away from the optical axis and encircling the second refractive portion. A second mating structure is annularly formed on the object side surface of the second positioning portion and molded with the second refractive portion as a single integral. The first mating structure and the second mating structure are engaged with each other to align the first lens and the second lens along the optical axis, and the first refractive portion of the first lens and the second refractive portion of the second lens are coaxial with each other and have the axis as the optical axis.

As described above, each of the positioning portions and the mating structures in this invention are molded with the refractive portions as a single integral, so the positioning portion and the mating structure have less manufacturing tolerance. Therefore, the lenses can be assembled with high assembling accuracy together so as to avoid relative positioning deviation of the lens caused by the manufacturing error of the lens housing, and improve the production yield of the lens module.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
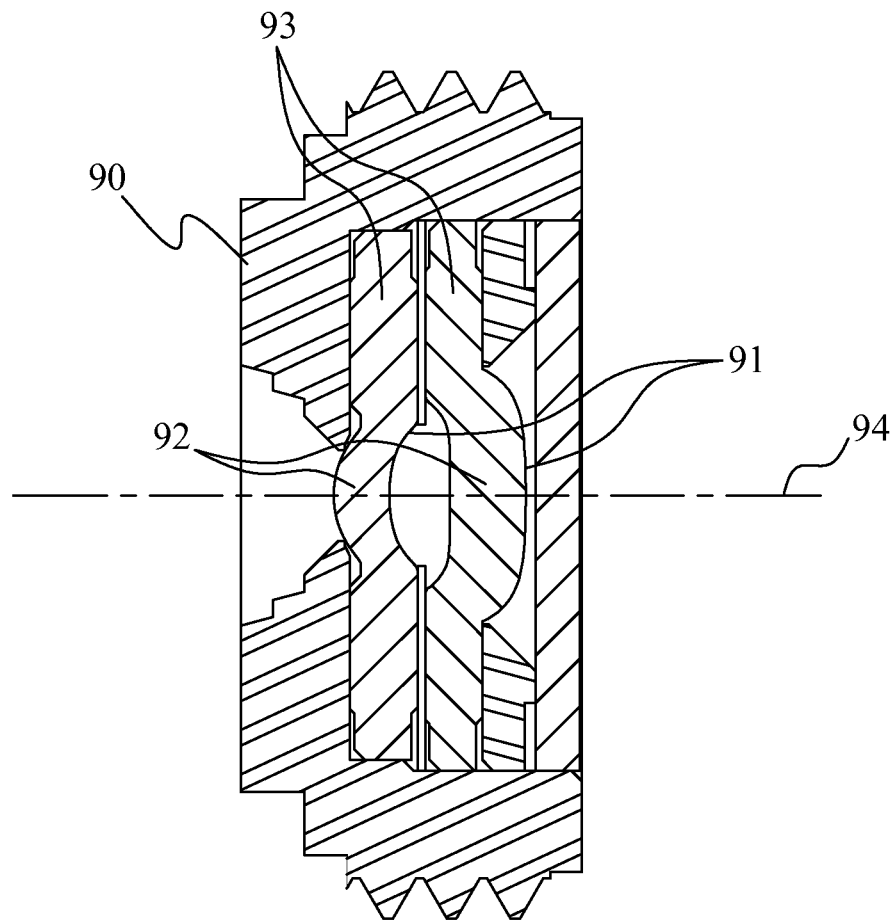
FIG. 1 shows a cross-sectional view of a conventional lens module.
Figure 2:
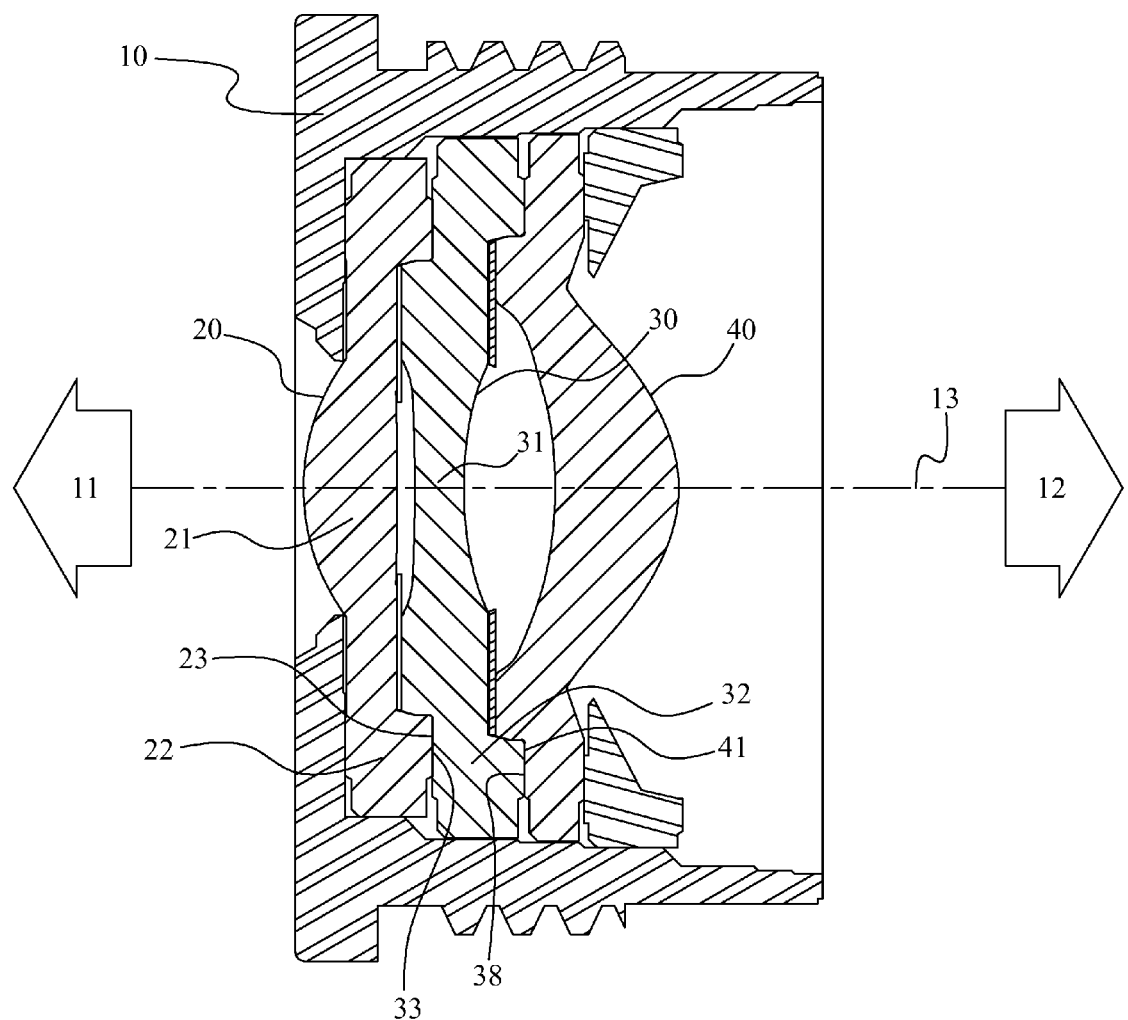
FIG. 2 shows a cross-sectional view of a lens module in this invention.

With reference to FIG. 2, a lens module in accordance with the present invention is shown and an optical axis 13 passes through the lens module from an object side 11 to an image side 12. The lens module includes a lens housing 10 and three lenses which are disposed in the lens housing 10 from the object side 11 to the image side 12 in sequence, wherein the three lenses are designated as a first lens 20, a second lens 30 and a third lens 40 respectively.

The first lens 20 has a first refractive portion 21 through which the optical axis 13 passes and a first positioning portion 22 away from the optical axis 13 and encircling the first refractive portion 21. The first lens 20 is arranged and fixed to the lens housing 10 by means of the first positioning portion 22. A first mating structure 23 is annularly formed on the image side surface of the first positioning portion 22. The first mating structure 23 is molded with the first refractive portion 21 as a single integral, so the first mating structure 23 has the same great manufacturing precision as producing optical-component, and has very low manufacturing error.

The second lens 30 has a second refractive portion 31 through which the optical axis 13 passes and a second positioning portion 32 away from the optical axis 13 and encircling the second refractive portion 31. A second mating structure 33 is annularly formed on the object side surface of the second positioning portion 32, and also molded with the second refractive portion 31 as a single integral, so the second mating structure 33 also has the same great manufacturing precision as producing optical-component, and has very low manufacturing error. The first mating structure 23 and the second mating structure 33 are engaged with each other to align the first lens 20 and the second lens 30 along the optical axis 13. The first refractive portion 21 of the first lens 20 and the second refractive portion 31 of the second lens 30 are coaxial with each other and have the axis as the optical axis 13.

Since the first lens 20 and the second lens 30 are positioned by engaging the first mating structure 23 with the second mating structure 33, so the manufacturing error of the lens housing 10 will not affect the eccentric error between the first lens 20 and the second lens 30. Moreover, the mating structures 23, 33 are respectively molded with the refractive portions 21, 31 as a single integral by optical molds that are used for casting optical lenses, so the manufacturing error of the mating structure 23, 33 is very small, and it effectively reduces the eccentric error between the first lens 20 and second lens 30.

In this embodiment, the total quantity of lenses are three. A third mating structure 38 is formed on the image side surface of the second lens 30, and a fourth mating structure 41 is formed on the object side surface of the third lens 40. The third lens 40 is fixed with the second lens 30 by mating the fourth mating structure 41 with the third mating structure 38. The third mating structure 38 and the fourth mating structure 41 are also molded with optical mold that is used for casting optical lenses, so the manufacturing error can also be minimized. But in use, the quantity of lenses is adjustable according to the requirement, and should not be limited to three.

Figure 3:
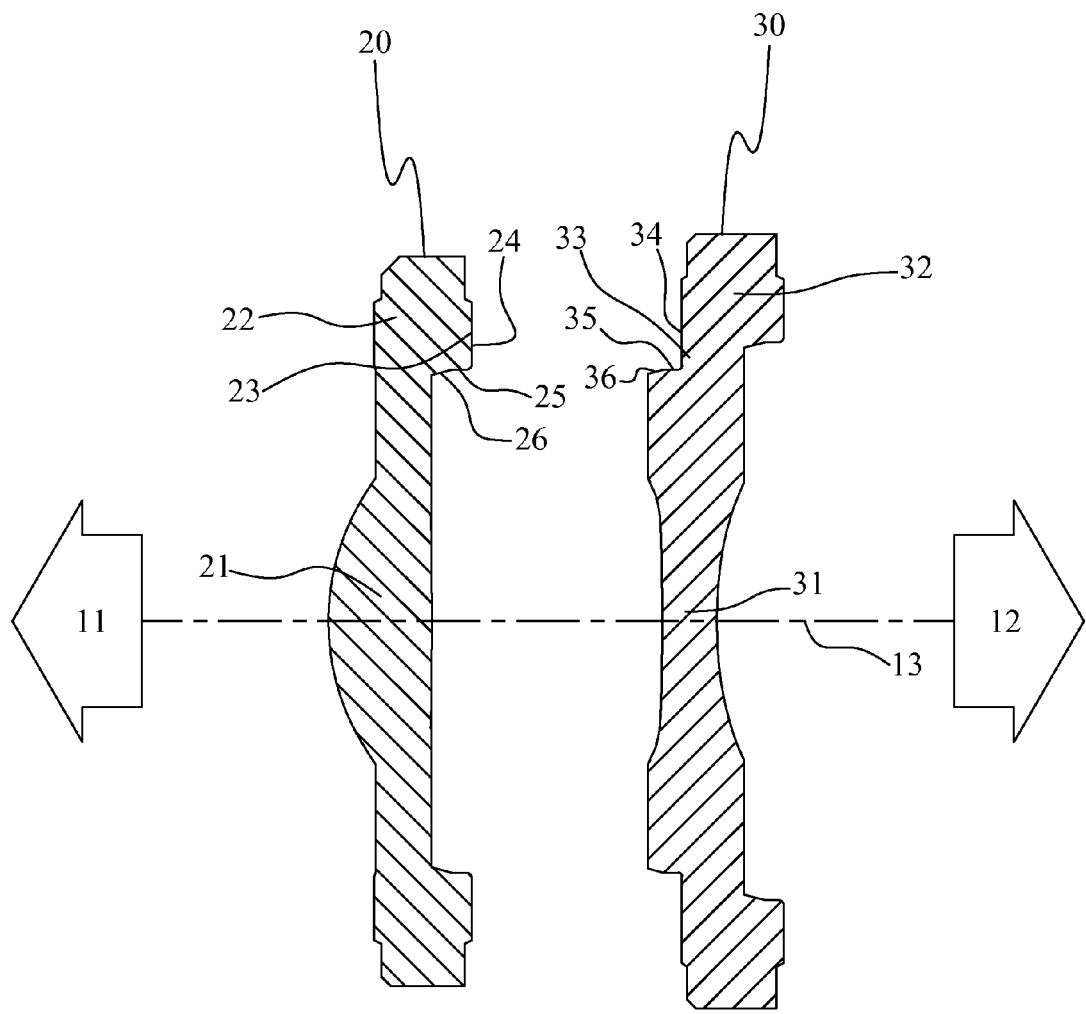
FIG. 3 shows a cross-sectional view of the lens module of FIG. 2, wherein a first lens and a second lens are not yet mated.
Figure 4:
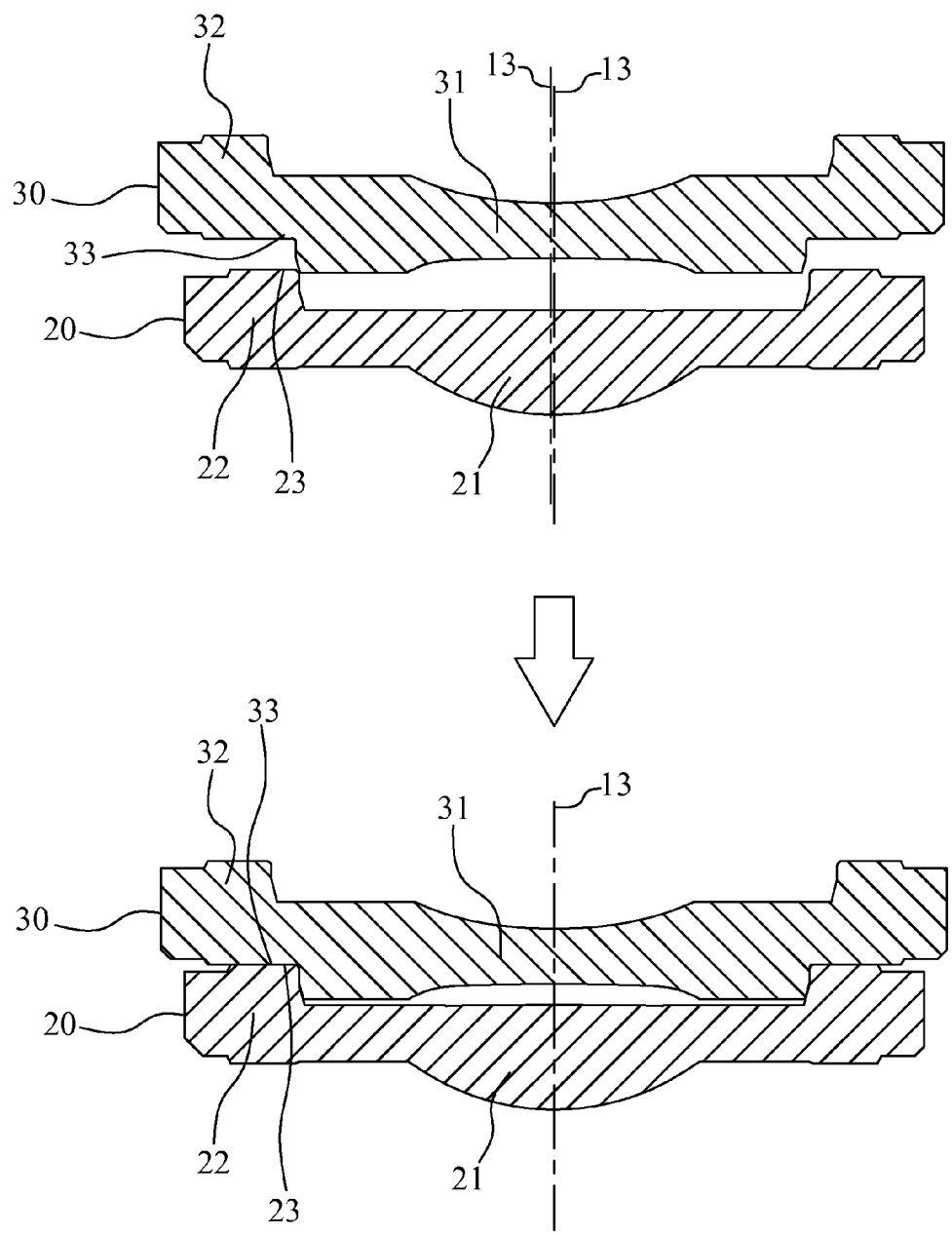
FIG. 4 is a cross-sectional view showing the mating process of the first lens and the second lens of FIG. 3.

Referring to FIG. 3 and FIG. 4, in this embodiment, the first mating structure 23 is an annular rib protruding towards the second lens 30 on the image side surface of the first positioning portion 22. The annular rib has a resisting face 24 vertical to the optical axis 13 and an outer sidewall 25 parallel to the optical axis 13. The corner defined by the outer sidewall 25 and the first positioning portion 22 defines a guiding slope 26 with the slope face thereof connecting with the outer sidewall 25 and the image side surface of the first positioning portion 22. The second mating structure 33 is an annular groove recessed into the object side surface of the second positioning portion 32 and facing to the annular rib. The annular groove has a stopping face 34 vertical to the optical axis 13 and an inner wall 35 parallel to the optical axis 13. A guiding face 36 is slantwise connected between the inner wall 35 and the object side surface of the second positioning portion 32.

When the second mating structure 33 joints with the mating jointing structure 23, the guiding slope 26 and the guiding face 36 cooperate with each other to guide the second lens 30 to align with the first lens 20 automatically along the optical axis 13. When the first mating structure 23 is completely mated with the second mating structure 33, the first refractive portion 21 of the first lens 20 and the second refractive portion 31 of the second lens 30 are coaxial with each other and have the axis as the optical axis 13. The outer sidewall 25 abuts against the inner wall 35 to keep the first lens 20 and the second lens 30 coaxial, and the resisting face 24 resists against the stopping face 34 to keep the distance between the first lens 20 and the second lens 30 constant.

As described above, each of the positioning portions 22, 32 and the mating structures 23, 33 are molded with the refractive portions 21, 31 integrally, so the positioning portions 22, 32 and the mating structures 23, 33 are manufactured in high manufacturing precision. Therefore, the lenses 20, 30 can be assembled with high assembling accuracy together so as to avoid relative positioning deviation of the lenses 20, 30 caused by the manufacturing error of the lens housing 10, and improve the production yield of the lens module.

What is claimed is:

1. A lens module with an optical axis passing therethrough from an object side to an image side, comprising:
    a first lens having a first refractive portion through which the optical axis passes and a first positioning portion away from the optical axis and encircling the first refractive portion, a first mating structure being annularly formed on an image side surface of the first positioning portion and molded with the first refractive portion as a single integral;
    a second lens having a second refractive portion through which the optical axis passes and a second positioning portion away from the optical axis and encircling the second refractive portion, a second mating structure being annularly formed on an object side surface of the second positioning portion and molded with the second refractive portion as a single integral; and
    a lens housing in which the first lens and the second lens are disposed from the object side to the image side in sequence, wherein the first mating structure and the second mating structure are engaged with each other to align the first lens and the second lens along the optical axis, the first refractive portion of the first lens and the second refractive portion of the second lens are coaxial with each other and have the axis as the optical axis;
    wherein the first mating structure is an annular rib protruding towards the second lens on the image side surface of the first positioning portion, the annular rib has a resisting face vertical to the optical axis and an outer sidewall parallel to the optical axis, and the second mating structure is an annular groove recessed into the object side surface of the second positioning portion and facing the annular rib, the annular groove has a stopping face vertical to the optical axis and an inner wall parallel to the optical axis, when the first mating structure is engaged with the second mating structure, the outer sidewall abuts against the inner wall to keep the first lens and the second lens coaxial, and the resisting face resists against the stopping face to keep the distance between the first lens and the second lens constant.

2. The lens module as claimed in claim 1, wherein a corner defined by the outer sidewall and the first positioning portion defines a guiding slope with a slope face thereof connecting with the outer sidewall and the image side surface of the first positioning portion, and a guiding face is slantwise connected between the inner wall and the object side surface of the second positioning portion, when the second mating structure is engaged with the first mating structure, the guiding slope and the guiding face cooperate with each other to guide the second lens to align with the first lens automatically.

3. A lens module with an optical axis passing therethrough from an object side to an image side, comprising:
    a first lens having a first refractive portion and a first mating structure which is annularly formed on an image side surface around the first refractive portion;
    a second lens having a second refractive portion and a second mating structure which is annularly formed on an object side surface around the second refractive portion; and
    a lens housing in which the first lens and the second lens are disposed from the object side to the image side in sequence, wherein the first mating structure and the second mating structure are engaged with each other to align the first lens and the second lens along the optical axis, the first refractive portion of the first lens and the second refractive portion of the second lens are coaxial with each other and have the axis as the optical axis;
    wherein the first mating structure is an annular rib protruding towards the second lens on the image side surface, the annular rib has a resisting face vertical to the optical axis and an outer sidewall parallel to the optical axis, and the second mating structure is an annular groove recessed into the object side surface and facing the annular rib, the annular groove has a stopping face vertical to the optical axis and an inner wall parallel to the optical axis, when the first mating structure is engaged with the second mating structure, the outer sidewall abuts against the inner wall to keep the first lens and the second lens coaxial, and the resisting face resists against the stopping face to keep the distance between the first lens and the second lens constant.

4. The lens module as claimed in claim 3, wherein a corner defined by the outer sidewall and the image side surface of the first lens defines a guiding slope with a slope face thereof connecting with the outer sidewall and the image side surface, and a guiding face is slantwise connected between the inner wall and the object side surface of the second positioning portion, when the second mating structure is engaged with the first mating structure, the guiding slope and the guiding face cooperate with each other to guide the second lens to align with the first lens.

* * * * *